US007826372B1

(12) United States Patent
Mabe et al.

(10) Patent No.: US 7,826,372 B1
(45) Date of Patent: Nov. 2, 2010

(54) NETWORK ROUTING PROCESS FOR REGULATING TRAFFIC THROUGH ADVANTAGED AND DISADVANTAGED NODES

(75) Inventors: Fred D. Mabe, Marion, IA (US); Ian R. Worden, Marion, IA (US); David C. Nicholas, Cedar Rapids, IA (US); Stephen M. Clark, Vinton, IA (US); Albert J. Anderson, Richardson, TX (US); James A. Stevens, Lucas, TX (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 1569 days.

(21) Appl. No.: 10/811,000

(22) Filed: Mar. 26, 2004

(51) Int. Cl.
*G01R 31/08* (2006.01)
(52) U.S. Cl. .................... 370/237; 370/400; 370/255
(58) Field of Classification Search ............. 370/400, 370/401, 229, 235, 238, 252, 253, 254, 255; 709/238
See application file for complete search history.

(56) References Cited

U.S. PATENT DOCUMENTS

| | | | |
|---|---|---|---|
| 4,504,946 A | 3/1985 | Raychaudhuri | 370/322 |
| 4,763,322 A | 8/1988 | Eizenhofer | 370/337 |
| 5,012,469 A | 4/1991 | Sardana | 370/322 |
| 5,117,422 A | 5/1992 | Hauptschein et al. | 370/255 |
| 5,245,609 A | 9/1993 | Ofek et al. | 370/348 |
| 5,295,140 A | 3/1994 | Crisler et al. | 370/443 |
| 5,396,496 A | 3/1995 | Ito et al. | 370/314 |
| 5,420,858 A | 5/1995 | Marshall et al. | 370/352 |
| 5,448,698 A | 9/1995 | Wilkes | 395/200.01 |
| 5,450,394 A | 9/1995 | Gruber et al. | 370/17 |
| 5,457,681 A | 10/1995 | Gaddis et al. | 370/402 |
| 5,502,722 A | 3/1996 | Fulghum | 370/69 |
| 5,506,848 A | 4/1996 | Drakopolous et al. | 370/336 |
| 5,568,477 A | 10/1996 | Galand et al. | 370/60 |
| 5,581,548 A | 12/1996 | Ugland et al. | 370/330 |
| 5,594,720 A | 1/1997 | Papadopolous et al. | 370/330 |
| 5,598,417 A | 1/1997 | Crisler et al. | 370/348 |
| 5,613,198 A | 3/1997 | Ahmadi et al. | 370/337 |
| 5,625,629 A | 4/1997 | Wenk | 370/330 |

(Continued)

OTHER PUBLICATIONS

L. Pond and V. Li, "Bridging the Gap Interoperability, Survivability, Security," 1989 IEEE MILCOM, Conference Record, vol. 1 of 3.

(Continued)

*Primary Examiner*—Ricky Ngo
*Assistant Examiner*—Chandrahas Patel
(74) *Attorney, Agent, or Firm*—Matthew J. Evans; Daniel M. Barbieri

(57) ABSTRACT

A process for use in conjunction with a communications network routing protocol that automatically adjusts for congestion that may occur due to the presence of advantaged and partially disadvantaged nodes. The network nodes check to determine if they are advantaged or partially disadvantaged. Advantaged nodes may, for example, be airborne or satellite nodes having a high degree of network connectivity. Partially disadvantaged nodes may comprise nodes that are low on power. Advantaged nodes and partially disadvantaged nodes adjust the network metrics entered into the routing tables they use to advertise their routing information over the network to show longer pathways through such nodes. As a result the other nodes in the network reduce the amount of network traffic routed through advantaged and disadvantaged nodes.

12 Claims, 3 Drawing Sheets

U.S. PATENT DOCUMENTS

| | | | |
|---|---|---|---|
| 5,644,576 | A | 7/1997 | Bauchot et al. ............ 370/437 |
| 5,652,751 | A | 7/1997 | Sharony .................... 340/2.4 |
| 5,696,903 | A | 12/1997 | Mahany ..................... 709/228 |
| 5,719,868 | A | 2/1998 | Young ........................ 370/436 |
| 5,742,593 | A | 4/1998 | Sharony et al. ............ 370/330 |
| 5,748,362 | A | 5/1998 | Delacourt et al. .......... 359/326 |
| 5,909,469 | A | 6/1999 | Frodigh et al. ............. 375/302 |
| 5,920,703 | A | 7/1999 | Campbell et al. .......... 709/236 |
| 5,949,760 | A | 9/1999 | Stevens et al. ............. 370/280 |
| 5,953,344 | A | 9/1999 | Dail et al. ................... 370/337 |
| 5,983,259 | A | 11/1999 | Campbell et al. .......... 709/200 |
| 6,014,089 | A | 1/2000 | Tracy et al. ........... 340/870.02 |
| 6,018,528 | A | 1/2000 | Gitlin et al. ................. 370/436 |
| 6,031,827 | A | 2/2000 | Rikkinen et al. ........... 370/330 |
| 6,084,888 | A | 7/2000 | Watanabe et al. .......... 370/473 |
| 6,084,889 | A | 7/2000 | Murakami .................. 370/474 |
| 6,088,659 | A | 7/2000 | Kelley et al. ................. 702/62 |
| 6,094,425 | A | 7/2000 | Auger et al. ................ 370/330 |
| 6,094,429 | A | 7/2000 | Blanchette et al. ......... 370/337 |
| 6,122,293 | A | 9/2000 | Frodigh et al. ............. 370/473 |
| 6,140,184 | A | 10/2000 | Dupuy ........................ 370/337 |
| 6,151,319 | A | 11/2000 | Dommety et al. ...... 370/395.52 |
| 6,157,656 | A | 12/2000 | Lindgren et al. ............ 370/458 |
| 6,252,868 | B1 | 6/2001 | Diachina et al. ............ 370/347 |
| 6,256,304 | B1 | 7/2001 | Vayrynen .................... 370/350 |
| 6,256,477 | B1 | 7/2001 | Eidson et al. ............. 455/63.3 |
| 6,275,506 | B1 | 8/2001 | Fazel et al. ................. 370/459 |
| 6,304,559 | B1 | 10/2001 | Jacklin et al. .............. 370/310 |
| 6,310,867 | B1 | 10/2001 | Tat et al. ..................... 370/254 |
| 6,314,084 | B1 | 11/2001 | Kahale et al. ............... 370/230 |
| 6,317,436 | B1 | 11/2001 | Young et al. ................ 370/443 |
| 6,324,184 | B1 | 11/2001 | Hou et al. .................. 340/7.43 |
| 6,331,973 | B1 | 12/2001 | Young et al. ................ 370/337 |
| 6,353,598 | B1 | 3/2002 | Baden et al. ................ 370/473 |
| 6,353,605 | B1 | 3/2002 | Rautanen et al. ........... 370/337 |
| 6,369,719 | B1 | 4/2002 | Tracy et al. ........... 340/870.02 |
| 6,384,739 | B1 | 5/2002 | Roberts, Jr. et al. ......... 340/905 |
| 6,389,273 | B1 | 5/2002 | Brandenburg ............... 455/296 |
| 6,414,955 | B1 | 7/2002 | Clare et al. ................. 370/390 |
| 6,442,157 | B1 | 8/2002 | Carter et al. ................ 370/347 |
| 6,466,793 | B1 | 10/2002 | Wallstedt et al. ........... 455/450 |
| 6,487,186 | B1 | 11/2002 | Young et al. ................ 370/336 |
| 6,498,667 | B1 | 12/2002 | Masucci et al. ............... 398/98 |
| 6,504,829 | B1 | 1/2003 | Young et al. ................ 370/337 |
| 6,515,972 | B1 | 2/2003 | Gage et al. .................. 370/328 |
| 6,529,443 | B2 | 3/2003 | Downey et al. ............... 367/76 |
| 6,553,424 | B1 | 4/2003 | Kranz et al. ................ 709/234 |
| 6,556,899 | B1 | 4/2003 | Harvey et al. ................ 701/29 |
| 6,574,206 | B2 | 6/2003 | Young ........................ 370/337 |
| 6,600,754 | B1 | 7/2003 | Young et al. ................ 370/459 |
| 6,628,636 | B1 | 9/2003 | Young ........................ 370/337 |
| 6,631,124 | B1 | 10/2003 | Koorapaty et al. .......... 370/337 |
| 6,643,322 | B1 | 11/2003 | Varma et al. ................ 375/227 |
| 6,711,177 | B1 | 3/2004 | Young et al. ................ 370/468 |
| 6,771,626 | B1 | 8/2004 | Golubiewski et al. ....... 370/336 |
| 6,781,967 | B1 | 8/2004 | Young et al. ................ 370/312 |
| 6,791,994 | B1 | 9/2004 | Young et al. ................ 370/436 |
| 6,810,022 | B1 | 10/2004 | Young et al. ................ 370/280 |
| 7,139,262 | B1 * | 11/2006 | Elliott ........................ 370/351 |
| 7,177,295 | B1 * | 2/2007 | Sholander et al. ........... 370/338 |
| 7,200,116 | B2 * | 4/2007 | Kobayashi .................. 370/237 |
| 7,200,122 | B2 * | 4/2007 | Goringe et al. ............. 370/255 |
| 7,212,490 | B1 * | 5/2007 | Kao et al. .................... 370/222 |
| 7,440,573 | B2 * | 10/2008 | Lor et al. ..................... 380/270 |
| 2002/0001294 | A1 | 1/2002 | Amouris ...................... 370/337 |
| 2002/0046381 | A1 | 4/2002 | Morris et al. ............... 714/752 |
| 2003/0202574 | A1 | 10/2003 | Budka et al. ................ 375/227 |

OTHER PUBLICATIONS

Bittle, Caples, Young, "Soldier Phone: An Innovative Approach to Wireless Multimedia Communications," 1998 IEEE MILCOM, vol. 3.

Sunlin, "A Hybrid Distributed Slot Assignment TDMA Channel Access Protocol," IEEE Military Communications Conference, 1990, vol. 3 of 3.

Young and Stevens, "Clique Activation Multiple Access (CAMA): A Distributed Heuristic for Building Wireless Datagram Networks," IEEE Military Communications Conference 1998, vol. 1 I. Chlamtac and A. Farago, "An Optimal Channel Access Protocol with Multiple Reception Capacity," Dept. of Telecommunications & Telematics, Technical University of Budapest, Budapest, Hungary. Publication date unknown; believed to be 1993.

Ju et al. "An Optimal Topology-Transport Scheduling Method in Multihop Packet Radio Networks." IEEE/ACM Transactions on Networking. Jun. 1998. pp. 298-306.

Chakraborty et al. "Generic Algorithm for Broadcast Scheduling in Packet Radio Networks," Evolutionary Computation Proceedings, 1998. IEEE World Congress on Computational Intelligence. May 4-9, 1998. pp. 183-188.

Pond et al. "A Distributed Time-Slot Assignment Protocol for Mobile Multi-Hop Broadcast Packet Radio Networks," IEEE MILCOM, 1989. Oct. 15-18, 1989. pp. 70-74.

Arikan, E. "Some Complexity Results about Packet Radio Networks," IEEE Transactions on Information Theory, v.IT-30, No. 4, Jul. 1984, pp. 681-685.

Chou et al. "Slot Allocation Strategies for TDMA Protocols in Multihop Packet Radio Network." Eleventh Annual Joint Conference of the IEEE Computer and Communications Societies, May 4-8, 1992, pp. 710-716.

Oono et al. "Dynamic Slot Allocation Technology for Mobile Multi-Media TDMA Systems Using Distributed Control Scheme," IEEE. Oct. 12-16, 1997. pp. 74-78.

Young, "USAP: A Unifying Dynamic Distributed Multichannel TDMA Slot Assignment Protocol," Proc. IEEE MILCOM 1996, vol. 1, Oct. 1996.

U.S. Appl. No. 09/422,498, "Method and Apparatus for Managing Communication Resources Using Dynamic and Static Assignment of Communication Slots," filed Oct. 21, 1999, C. David Young.

U.S. Appl. No. 09/649,802, "Maintaining an Adaptive Broadcast Channel Using Both Transmitter Directed and Receiver Directed Broadcast," filed Aug. 29, 2000, C. David Young.

U.S. Appl. No. 09/303,802, "Clique Activation Multiple Access," filed Apr. 30, 1999, C. D. Young et al.

U.S. Appl. No. 10/689,448, "Heuristics for Combining Inter-Channel and Intra-Channel Communications in a Wireless Environment," filed Oct. 20, 2003, C. David Young et al.

U.S. Appl. No. 10/847,786, "On-Demand Broadcast Protocol," filed May 18, 2004, C. David Young et al.

U.S. Appl. No. 10/867,481, "Artery Nodes," filed Jun. 14, 2004, C. David Young et al.

U.S. Appl. No. 10/782,716, "Hybrid Open/Closed Loop Filtering For Link Quality Estimation," filed Feb. 19, 2004, Steven L. VanLaningham et al.

* cited by examiner

NETWORK ROUTING PROCESS FOR REGULATING TRAFFIC THROUGH ADVANTAGED AND DISADVANTAGED NODES

FIELD OF THE INVENTION

The present invention relates to routing protocols for use in digital communication networks and more particularly to routing processes for avoiding traffic congestion at advantaged and disadvantaged nodes in mobile ad hoc networks.

BACKGROUND OF THE INVENTION

The term mobile ad hoc network (MANET) refers to an autonomous digital communications system having multiple nodes in which all nodes may not be fully connected to all other nodes, nodes are autonomous and required to make their own routing decisions, nodes are often mobile, and standard hierarchical addressing (addresses assigned based on the subnetwork the node is in) is not used. These networks don't usually use servers and routers in the traditional way and are characterized by dynamic topologies formed through the exchange of information by the nodes themselves. Individual nodes in such systems may have multiple communications interfaces but one IP address is usually used to represent all node interfaces. Typical mobile ad hoc networks include cellular telephone systems, emergency services communications systems and military battlefield communications networks.

Many MANET networks include differentiated services, which allow traffic over the network to be prioritized in accordance with different user determined "code-point" classes. Accordingly, different types of traffic may be transmitted through the network in accordance with different behaviors in order to address different quality of service (QoS) objectives and delivery requirements. Differentiated services are very important in military and emergency communications where certain types of messages must be delivered on a priority basis and certain data must be delivered on a regular schedule.

An advantaged node has features that make the node advantageous for use as a router and communications link by many other nodes in a network system. For example, advantaged nodes may have higher connectivity (perhaps by virtue of high altitude), higher bandwidth, or long haul characteristics (such as HF radio, microwave or satellite links). Advantaged nodes may also comprise nodes with interfaces to other systems that provide special services (such as internet access) or provide interfaces to additional links with significantly better connectivity and/or higher bandwidth. A good example of an advantaged node might be a military aircraft flying over a battlefield on which a large number of military ground vehicles are deployed having network nodes which are actively exchanging information with one another and with the over-flying aircraft. Unfortunately, such advantaged nodes have the potential to attract far too much network traffic causing congestion and routing bottlenecks.

A disadvantaged node has features that render it unstable or unreliable in service. Examples of disadvantaged nodes include helicopters which, by virtue of their mission, may be popping in and out of radio frequency (RF) connectivity, a node switching in and out of radio transmit silence mode (EMCON), a node low on power, or a node that is channel surfing and therefore popping in and out of the network. Disadvantaged nodes maybe of two types: either totally disadvantaged or partially disadvantaged. Partially disadvantaged nodes are usually nodes that are low on power, but they may comprise nodes affected by other disabilities: either by type or degree.

Both advantaged nodes and disadvantaged nodes can cause serious communications problems. In mobile ad hoc networks these problems can be especially acute and can arise in unpredictable ways as mobile nodes move and their network links change. In the past, solutions to this problem have been discussed involving the use of modified route discovery routing algorithms adapted for load balancing and for selecting better routing pathways' as opposed to the shortest pathway. Unfortunately, such solutions are usually difficult to implement, involve a considerable increase in computational overhead, and are likely to be most useful in link state type network routing systems.

SUMMARY OF THE INVENTION

The present invention comprises a process for use in conjunction with a communications network routing protocol which automatically adjusts for congestion that may occur due to the presence of advantaged and partially disadvantaged nodes in ad hoc communications networks and especially in MANET networks having large numbers of nodes. Each node in these communications networks includes and maintains a routing table having entries which define communications pathways for routing messages through the network to other destinations (other nodes). Each routing table includes communications metrics, representing the costs or efficiencies for transferring messages along the message pathways defined in the table. In accordance with the present invention, each network node checks and determines if it qualifies as an advantaged node which may experience heavy network traffic, potentially causing network traffic congestion and communications delays. Each node also may check and determine whether it comprises a partially disadvantaged node subject to a disability such as low power. Each advantaged node increases one or more of the metrics of all routing pathways through it as they are entered into the routing table it uses to advertise its routing information over the network. The metrics are increased or incremented by a significant amount selected to discourage network traffic from being routed to the advantaged node and passing through it. Each partially disadvantaged node then increases one or more of the metrics of all routing pathways through it as they are entered into its routing table by a large amount selected to discourage all but essential traffic from being routed through it. The advantaged and disadvantaged nodes advertise these special routing tables with adjusted metrics across the network for the purpose of updating the routing tables of all other nodes so that the pathway and metric information is propagated across the network. As a result a substantial amount of the network traffic normally experienced by advantaged and disadvantaged nodes (without the routing metric adjustments) may be routed around them. Nodes may check to determine if they comprise advantaged nodes by calculating a ratio corresponding to the number of the node's communications neighbors divided by the average number of its neighbors' communications neighbors. Alternatively, the amount of the increase in the communications metrics implemented by advantaged nodes may be made a variable function of a measure of how much traffic which advantaged nodes are experiencing, thereby enabling traffic flow through advantaged nodes to be regulated as a function of their traffic load. In an alternative embodiment comprising a communications network featuring differentiated services, the increase in the communications metrics implemented by advantaged nodes may be a function of code-point levels in order to provide traffic conditioning by allowing high priority traffic preferred access to and through advantaged nodes.

It is an object of the present invention to provide a process for use as part of a routing protocol in ad hoc networks which helps adjust and balance network traffic through advantaged and partially disadvantaged nodes and improves communications efficiency through such networks.

It is another object of the present invention to provide a process for use in conjunction with a routing protocol that identifies advantaged nodes and provides a measure of the degree to which a node is advantaged and may be subject to network traffic congestion.

It is a further object of the present invention to provide a process for use as part of a routing protocol that helps balance network traffic in networks having advantaged nodes and discourage network traffic through such nodes in proportion to the degree to which they may be subject to traffic congestion.

It is yet another object of the present invention to provide a process for use as part of a routing protocol that helps adjust network traffic in networks in accordance with differentiated services requirements.

It is a yet further object of the present invention to provide a process for discouraging the routing of low priority network traffic through advantaged nodes while allowing high priority traffic preferred access to advantaged node as a function of code-point service level.

It is yet another object of the present invention to provide a process for use as part of a routing protocol that helps adjust network traffic in a simple manner without a large amount of computational overhead.

DETAILED DESCRIPTION

Figure 1:
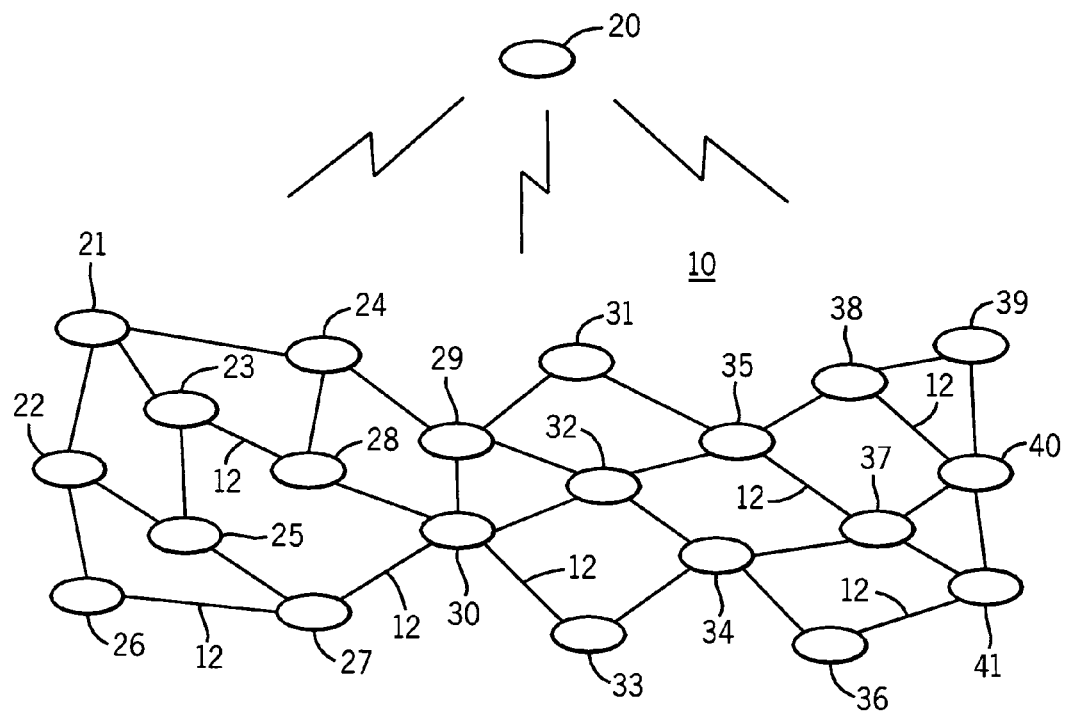
FIG. 1 provides a diagrammatic view of a larger scale network including a single elevated advantaged node having communication links with all of the other nodes in the network.

Referring now to FIG. 1, the network 10 constitutes a MANET network comprising the communications nodes 20-41 which represent black box radio systems sharing a common physical radio frequency (RF) channel (no isolation) and implementing one or more communications waveforms and associated digital networking protocols. The nodes 20-41 may be routers or hosts and may be linked to other nodes (not shown) by non-RF interfaces to form hybrid network systems. Node 20 comprises an advantaged node by virtue of its ability to communicate with all of the nodes 21-41. The communications links extending between adjacent nodes such as links 12 indicate that these nodes are one-hop RF neighbors which on account of their more limited range for communications may be termed non-advantaged nodes. The lightning bolt symbols indicate the general RF coverage zone of the advantaged node, which in this particular example includes all of the nodes 21-41. The higher connectivity of the advantaged node may be due to higher altitude, higher bandwidth, higher broadcasting power or better long haul characteristics (such as HF radio, microwave or satellite links). Advantaged nodes may also comprise nodes such as landmark routers with links to other systems that provide special services such as internet access or with links having significantly better connectivity and/or higher bandwidth (high capacity backbones).

The advantaged node 20 attracts traffic from all over the network 10 since it provides an alternative two-hop communications path for all nodes 21-41 that are otherwise three or more hops away from one another. As a consequence, even in a modest sized network such as the network 10 well over fifty percent of the network traffic may try to flow through the advantaged node 20 causing numerous packet collisions and a large amount of traffic congestion at node 20 resulting in unanticipated communications delays which may even lead to messages being dropped.

Advantaged nodes may be recognized by having each network node periodically exchange information with its immediate neighbors to establish a ratio of the number of its immediate neighbors to the average number of its neighbors' immediate neighbors.

This information may be exchanged in conjunction with the normal exchange of routing table data. This ratio may then be compared at each node to a fixed ratio or number such as 3.0 in order to provide an indication of whether the node is currently in a position to be or operate as an advantaged node. In a further embodiment, this ratio may be compared to several fixed numbers in order to define the extent to which the node is advantaged.

Once a node such as the node 20 is identified as an advantaged node, the number of potential collisions may be reduced and traffic congestion minimized on the network 10 by increasing the communications metrics in the routing tables of the nodes 21-41 for all communications pathways through the node 20. This may be accomplished by having the node 20 advertise routing information having specially adjusted metrics. All pathways leading through the node 20 are shown in the routing tables which this node advertises with communications metrics significantly increased or incremented from their true values.

For example, in a network using the common destination sequence destination vector (DSDV) routing protocol, all hop count metrics to destinations through advantaged nodes may be shown as two hops more than their normal values. This discourages traffic through advantaged nodes except where the destination and source nodes are five or more hop counts apart. Likewise, in networks employing a link state type protocol one of the metrics defining the links with the advantaged nodes such as latency may be increased in value to reduce the flow of traffic through the node.

Figure 2:
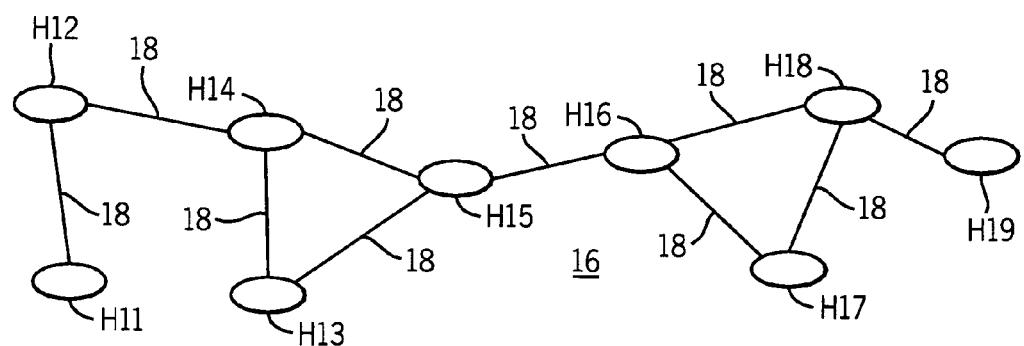
FIG. 2 provides a diagrammatic view of an small exemplary network not having an advantaged node.

Referring now to FIG. 2, the network 16 comprises a small MANET network having nine nodes H12-H19 connected by the RF links 18. The nodes H12-H19 all include routers and may be linked to other nodes (not shown) by non-RF interfaces to form hybrid network systems. The network 16 uses a typical DSDV routing protocol employing a routing algorithm that selects shortest path connection routes according to a hop count metric. Table 1 below defines a sample routing table showing normal shortest path entries 1-9 for the sample node H18 in the network 16 as shown in FIG. 2 after the network and table have had time to settle on stable routing values.

TABLE 1

| | | (H18) | | |
|---|---|---|---|---|
| ENTRY | DEST. | NEXT HOP | METRIC | SEQ. NO. |
| 1 | H1 | H16 | 5 | S912 |
| 2 | H12 | H16 | 4 | S120 |
| 3 | H13 | H16 | 3 | S502 |
| 4 | H14 | H16 | 3 | S456 |
| 5 | H15 | H16 | 2 | S800 |
| 6 | H16 | H16 | 1 | S212 |
| 7 | H17 | H17 | 1 | S174 |
| 8 | H18 | H18 | 0 | S606 |
| 9 | H19 | H19 | 1 | S560 |

Figure 3:
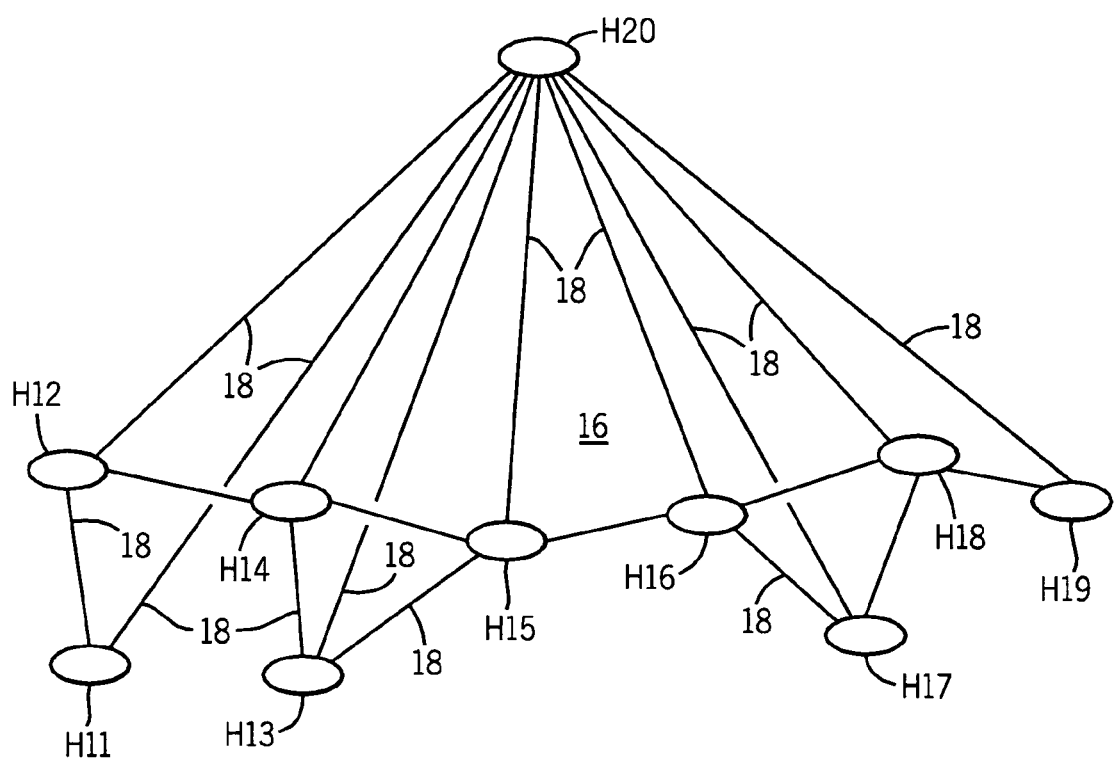
FIG. 3 provides a diagrammatic view of the small network of FIG. 2 with the addition of a single advantaged node having communication links with all of the other nodes in the network.

Referring now to FIG. 3, the network 16 is shown as now including the advantaged node H20. The node H20 could, for example, be an airborne node such as a command and control aircraft having high connectivity. Tables 2 below defines the normal routing table for node H20 for the network 16 as shown in FIG. 3 after the network has settled on stable values.

TABLE 2

| | | (H20) | | |
|---|---|---|---|---|
| ENTRY | DEST. | NEXT HOP | METRIC | SEQ. NO. |
| 1 | H1 | H12 | 1 | S912 |
| 2 | H12 | H12 | 1 | S120 |
| 3 | H13 | H12 | 1 | S502 |
| 4 | H14 | H12 | 1 | S456 |
| 5 | H15 | H12 | 1 | S800 |
| 6 | H16 | H16 | 1 | S212 |
| 7 | H17 | H17 | 1 | S174 |
| 8 | H18 | H18 | 1 | S606 |
| 9 | H19 | H19 | 1 | S560 |
| 10 | H20 | H20 | 0 | S110 |

As entries 1-9 in Table 2 illustrate node H20 is one hop away from all other nodes H11-19 in the network. Accordingly, if the routing tables for nodes H11-H19 were to be updated by a normal routing table advertisement from node H20 (reflecting the metrics shown in Table 2) a large number of pathways through node H20 would be established. As illustrated in Table 3 (hypothetical) for node H18 below entries 1-4 would reflect pathways through node H20. Likewise, the routing tables for nodes H11-H17 and H19 would contain a large number of entries for pathways through node H20 and, assuming a moderate communications load on the network 16, node H20 would have the potential to become a bottleneck and source of traffic congestion and potential communication delays. Further, it should be noted that the network 16 has been kept small in size so the principles of the present invention can be illustrated in a fairly simple fashion. The size of the networks involved might in practice be several hundred nodes or more, and the degree of congestion and the amount of delay might easily become serious problems as large volumes of traffic would be routed through any advantaged nodes in such networks.

TABLE 3

| | | (H18 - Normal Metrics) | | |
|---|---|---|---|---|
| ENTRY | DEST. | NEXT HOP | METRIC | SEQ. NO. |
| 1 | H11 | H20 | 2 | S922 |
| 2 | H12 | H20 | 2 | S130 |
| 3 | H13 | H20 | 2 | S512 |

TABLE 3-continued

| | | (H18 - Normal Metrics) | | |
|---|---|---|---|---|
| ENTRY | DEST. | NEXT HOP | METRIC | SEQ. NO. |
| 4 | H14 | H20 | 2 | S466 |
| 5 | H15 | H16 | 2 | S810 |
| 6 | H16 | H16 | 1 | S222 |
| 7 | H17 | H17 | 1 | S184 |
| 8 | H18 | H18 | 0 | S616 |
| 9 | H19 | H19 | 1 | S570 |
| 10 | H20 | H20 | 1 | S110 |

However, in accordance with the present invention, node H20 advertises a special routing table as shown in Table 4 whenever it detects that it constitutes an advantaged node. As shown in column four of Table 4, the values for the metrics of all routing entries are all incremented by two hop counts so that the pathways through node H20 look longer to the routing path selection algorithms running on the nodes H11-H19 for selecting best pathway to destination connections.

TABLE 4

| | | (H20 - Adjusted Metrics) | | |
|---|---|---|---|---|
| ENTRY | DEST. | NEXT HOP | METRIC | SEQ. NO. |
| 1 | H11 | H12 | 1 + 2 = 3 | S912 |
| 2 | H12 | H12 | 1 + 2 = 3 | S120 |
| 3 | H13 | H12 | 1 + 2 = 3 | S502 |
| 4 | H14 | H12 | 1 + 2 = 3 | S456 |
| 5 | H15 | H12 | 1 + 2 = 3 | S800 |
| 6 | H16 | H16 | 1 + 2 = 3 | S212 |
| 7 | H17 | H17 | 1 + 2 = 3 | S174 |
| 8 | H18 | H18 | 1 + 2 = 3 | S606 |
| 9 | H19 | H19 | 1 + 2 = 3 | S560 |
| 10 | H20 | H20 | 0 + 2 = 2 | S110 |

Accordingly, as shown by example in Table 5 with respect to node H18 when the routing tables for nodes H11-H19 are updated with routing information from the special routing table (advertisement table) with adjusted metrics from node H20 (Table 4), a lesser number of pathways through node H20 are established. As compared with Table 3, in Table 5 only entries 1 and 2 pass through node H20. Entries 3 and 4 have been redirected through other nodes. In effect, routes through H20 are established only if the nodes involved would otherwise be more than five hops apart (or four hops apart depending on the exact workings of the routing algorithms for the nodes H11-H19). Likewise, the routing tables for nodes H11-H17 and H19 would contain a lesser number of entries for pathways through node H20, and as a result, node H20 would be less likely to become a bottleneck and be a source of traffic congestion and cause communication delays. Again, the network 16 has been kept small in size so the principles of the present invention can be illustrated in a simple fashion. In practice, the networks involved might include hundreds or even thousands of nodes and the degree of the problem might become very large. In general, this would also require the metrics for routes through any advantaged nodes such as node H20 to be incremented by a larger amount (e.g. in Table 4—several hops instead of just two) in order to redirect sufficient amounts of traffic away from advantaged nodes:

TABLE 5

(H18 - Adjusted Metrics)

| ENTRY | DEST. | NEXT HOP | METRIC | SEQ. NO. |
|---|---|---|---|---|
| 1 | H11 | H20 | 4 | S922 |
| 2 | H12 | H20 | 4 | S130 |
| 3 | H13 | H16 | 3 | S512 |
| 4 | H14 | H16 | 3 | S466 |
| 5 | H15 | H16 | 2 | S810 |
| 6 | H16 | H16 | 1 | S222 |
| 7 | H17 | H17 | 1 | S184 |
| 8 | H18 | H18 | 0 | S616 |
| 9 | H19 | H19 | 1 | S570 |
| 10 | H20 | H20 | 1 | S110 |

Figure 4:
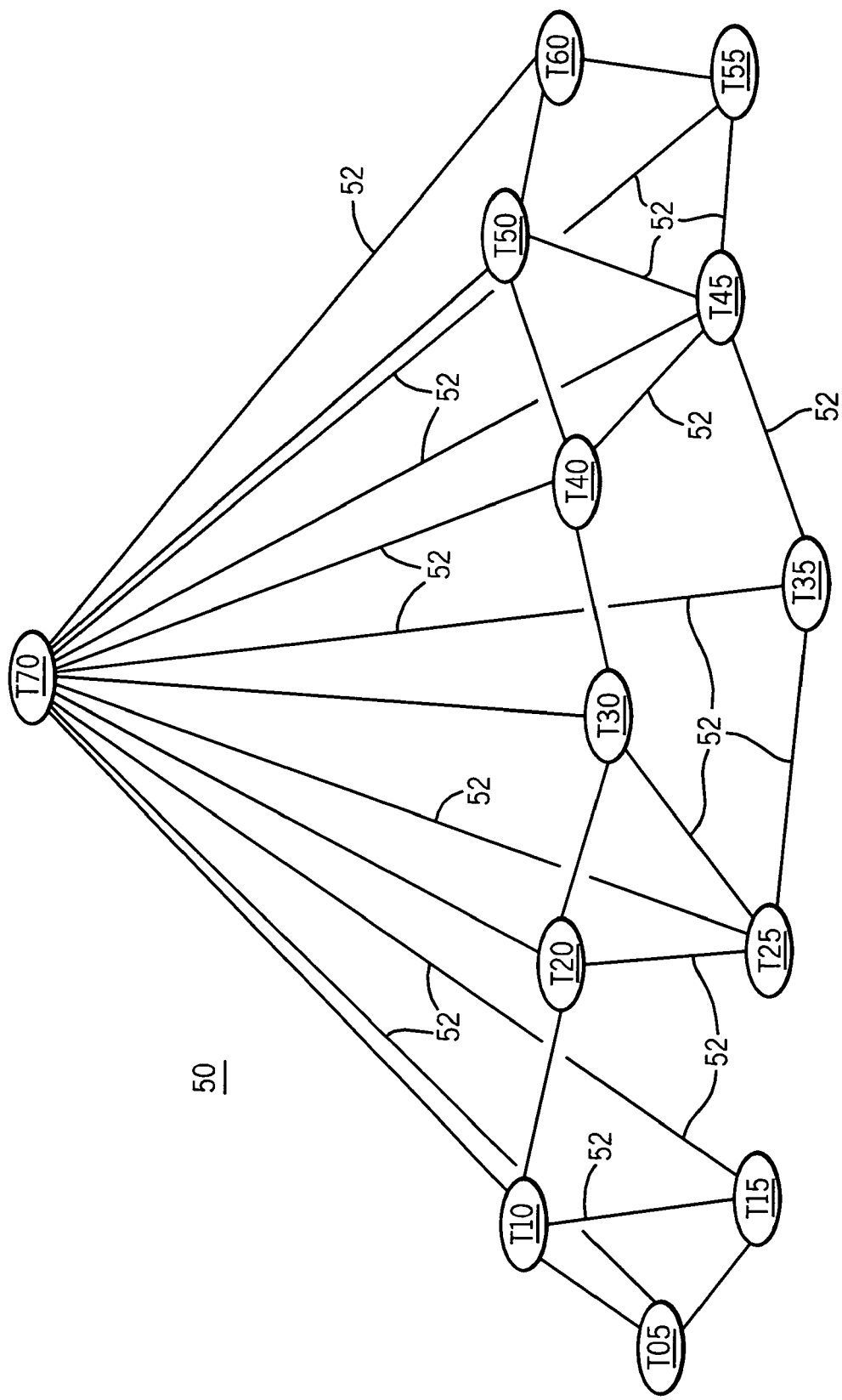
FIG. 4 provides a diagrammatic view of another small network having a single advantaged node using differentiated services with three code-point levels to prioritize the flow of traffic on the network.

Referring now to FIG. 4, the small MANET network 50 comprises the nodes T05, T10, T15, T20, T25, T30, T35, T40, T45, T55, T60, and T70 (nodes T05-T70) connected by RF links such as link 52. The nodes H12-H19 include routers and may be linked to other nodes (not shown) by non-RF interfaces to form hybrid network systems. The network 50 uses a typical DSDV routing protocol employing a routing algorithm that selects shortest path connection routes according to hop count metrics.

However, the routing protocol for network 50 also provides differentiated services at three different code-points (QoS levels) in forwarding packets across the network as a function of different user assigned priorities associated with different types of communications traffic. The Flash (FLH) code-point represents the highest level of service for high priority data requiring the fastest possible delivery to destination. Assured Forwarding Class 1 (AF1) code-point represents a normal level of service for data of medium priority requiring prompt delivery to destination. The Assured Forwarding Class 2 (AF2) code-point represents the lowest level of service for lower priority data with respect to which modest delivery delays may be tolerated.

Table 6 below defines a sample routing table (hypothetical) showing normal shortest path entries 1-13 for the node T70 in the network 50 as shown in FIG. 4 after the network and table have had time to settle on stable routing values. In Table 6, the next hop locations and routing metrics are entered together in the same blocks in columns 3-5 as joint functions of the different differentiated services code-points. For example, the entry T10-1 would indicate a next hop at node T10 with a routing metric of one hop to final destination. Alternatively, separate routing tables could be employed for the data associated with each code-point. In effect, Table 6 displays multiple dimensions of routing information that is multiple next hops and pathway metrics as a function of code-point (multidimensional routing information).

As shown in FIG. 4 and as Table 6 helps illustrate, the node T70 is one hop away from a large number of other nodes T05-T60 and has substantially more immediate neighbors (12) than its neighbors have immediate neighbors (average 3.75) by a 3.2 ratio. Since network 50 sets its fixed ratio for identifying advantaged nodes at 3.0 the node T70 therefore qualifies (3.2≧3.0) as an advantaged node.

If the routing tables for nodes T05-T60 were to be updated with information from a routing table from node T70 having normal metrics (Table 6), a large number of routes through node T70 would be established as communications pathways between the various nodes in the network. The node T70 would have the potential to become a bottleneck and source of traffic congestion and potential communication delays. Further, it should be noted that the network 50 has been kept small in size so that the principles of the present invention can be illustrated in a fairly simple fashion. The networks involved might in practice include hundreds or thousands of nodes and the degree of this congestion and amounts of resulting delay might easily become serious as very large volumes of traffic are routed through advantaged nodes.

TABLE 6

(T70 - Normal Metrics)

| ENTRY | DEST. | NH - FLH | NH - AF1 | NH - AF2 | SEQ. NO. |
|---|---|---|---|---|---|
| 1 | T05 | T10 - 1 | T10 - 1 | T10 - 1 | S550 |
| 2 | T10 | T10 - 1 | T10 - 1 | T10 - 1 | S206 |
| 3 | T15 | T10 - 1 | T10 - 1 | T10 - 1 | S608 |
| 4 | T20 | T10 - 1 | T10 - 1 | T10 - 1 | S128 |
| 5 | T25 | T20 - 1 | T20 - 1 | T20 - 1 | S760 |
| 6 | T30 | T30 - 1 | T30 - 1 | T30 - 1 | S804 |
| 7 | T35 | T40 - 1 | T40 - 1 | T40 - 1 | S980 |
| 8 | T40 | T40 - 1 | T40 - 1 | T40 - 1 | S350 |
| 9 | T45 | T40 - 1 | T40 - 1 | T40 - 1 | S440 |
| 10 | T50 | T50 - 1 | T50 - 1 | T50 - 1 | S324 |
| 11 | T55 | T60 - 1 | T60 - 1 | T60 - 1 | S490 |
| 12 | T60 | T60 - 1 | T60 - 1 | T60 - 1 | S708 |
| 13 | T70 | T70 - 0 | T70 - 0 | T70 - 0 | S134 |

However, in accordance with the present invention, node T70 advertises a special routing table, as shown in Table 7, whenever it detects that it is an advantaged node. As shown in columns 3-5 of Table 7, the values for the metrics of the routing entries are all incremented by ∞ for AF2 (Assured Forwarding 2) traffic, are incremented by two hops for AF1 (Assured Forwarding 1) traffic, and are not incremented at all for FLH (Flash) traffic so that pathways through node T70 will look longer to the routing path selection algorithms running on the nodes T05-T60 for AF2 and AF1 traffic but not for the high priority FLH traffic.

TABLE 7

(T70 - Adjusted Metrics)

| ENTRY | DEST. | NH - FLH | NH - AFi | NH - AF2 | SEQ. NO. |
|---|---|---|---|---|---|
| 1 | T05 | T10 - 1 | T10 - 3 | T10 - ∞ | S550 |
| 2 | T10 | T10 - 1 | T10 - 3 | T10 - ∞ | S206 |
| 3 | T15 | T10 - 1 | T10 - 3 | T10 - ∞ | S608 |
| 4 | T20 | T10 - 1 | T10 - 3 | T10 - ∞ | S128 |
| 5 | T25 | T20 - 1 | T20 - 3 | T20 - ∞ | S760 |
| 6 | T30 | T30 - 1 | T30 - 3 | T30 - ∞ | S804 |
| 7 | T35 | T40 - 1 | T40 - 3 | T40 - ∞ | S980 |
| 8 | T40 | T40 - 1 | T40 - 3 | T40 - ∞ | S350 |
| 9 | T45 | T40 - 1 | T40 - 3 | T40 - ∞ | S440 |
| 10 | T50 | T50 - 1 | T50 - 3 | T50 - ∞ | S324 |
| 11 | T55 | T60 - 1 | T60 - 3 | T60 - ∞ | S490 |
| 12 | T60 | T60 - 1 | T60 - 3 | T60 - ∞ | S708 |
| 13 | T70 | T70 - 0 | T70 - 2 | T70 - ∞ | S134 |

Accordingly, as shown by example in Table 8 with respect to the routing table for node T50, when the routing tables for nodes T05-T60 are updated with routing information from the advantaged node T70 (Table 7) communications traffic through the node T70 is conditioned with a lesser number of pathways being established. In this case only entries 1 and 3 show routes through node T70 for AF1 code-point traffic and no entries are shown for routes through node T70 for AF2 code-point traffic, while six entries (entries 1-6) are shown through T70 for high priority FLH code-point traffic. In effect, AF1 traffic routes through T70 are established only if the nodes involved would otherwise be five or more hops apart (or four or more hops apart depending on the exact workings of the routing algorithms for the nodes T05-T60).

No routes through node T70 are established for AF2 traffic and traffic across the network is routed as if node T70 did not exist. On the other hand, FLH traffic routes are established through node T70 in a normal manner. Likewise, the routing tables for nodes T05-T45 and T55-T60 would contain fewer entries for pathways through node T70. As an overall result node T70 would be much less likely to become a bottleneck and source of traffic congestion and communication delays. Again, the network 50 has been kept small in size so that the principles of the present invention can be illustrated in a simple fashion. In practice, the networks involved might include hundreds or even thousands of nodes and the extent of the advantaged node problem might become very large requiring the metrics for routes through advantaged nodes (such as T70) to be incremented by larger amounts for AF1 traffic (Table 7—several hops instead of just two) to help redirect sufficient amounts of traffic away from advantaged nodes.

TABLE 8

(T50 Adjusted Metrics)

| ENTRY | DEST. | NH - FLH | NH- AFi | NH - AF2 | SEQ. NO. |
|---|---|---|---|---|---|
| 1 | T05 | T70 - 2 | T70 - 4 | T40 - 5 | S550 |
| 2 | T10 | T70 - 2 | T40 - 4 | T40 - 4 | S206 |
| 3 | T15 | T70 - 2 | T70 - 4 | T40 - 5 | S608 |
| 4 | T20 | T70 - 2 | T40 - 3 | T40 - 3 | S128 |
| 5 | T25 | T70 - 2 | T45 - 3 | T45 - 3 | S760 |
| 6 | T30 | T70 - 2 | T40 - 2 | T40 - 2 | S804 |
| 7 | T35 | T45 - 2 | T45 - 2 | T45 - 2 | S980 |
| 8 | T40 | T40 - 1 | T40 - 1 | T40 - 1 | S350 |
| 9 | T45 | T45 - 1 | T45 - 1 | T45 - 1 | S440 |
| 10 | T50 | T50 - 0 | T50 - 0 | T50 - 0 | S324 |
| 11 | T55 | T60 - 1 | T60 - 2 | T60 - 2 | S490 |
| 12 | T60 | T60 - 1 | T60 - 1 | T60 - 1 | S708 |
| 13 | T70 | T70 - 1 | T70 - 1 | T70 - 1 | S134 |

Table 8 shows how different routes through networks such as network 50 may be selected and traffic on the network regulated according to QoS objectives by raising the metric costs of routing through selected nodes for certain code-points. This route selection is then based on end-to-end optimization of differentiated services requirements. Raising of the metric costs can be either static or dynamic as a function of operating conditions (such as measures of connectivity, overall traffic or congestion). However, if a dynamic mechanism is used to change the cost of a link for a particular code-point then the changing of the cost metric values should be smoothed to ensure network thrashing does not occur.

Similarly the problems associated with routing through partially disadvantaged nodes (such as nodes low on power) may also be addressed by adjusting the routing table cost metrics which they advertise to other nodes in the network. The cost metric may be raised to infinity for all destinations on routes passing through the node in which case the node will operate as a host to receive traffic only. Alternatively, cost metrics associated with disadvantaged nodes may be raised with the exception of one or two selected differentiated services code-point classes in order to allow access to the node by high priority communications traffic only.

The mechanism that is used to raise the metric cost of routing through selected nodes is independent of the exact type of routing protocol. In the case of link state protocols, the latency metric for links with advantaged nodes may be increased to discourage traffic from being routed through such nodes. Furthermore, load leveling may be accomplished by controlling the metric costs through selected advantaged nodes when multiple paths that meet the requirements of a given code-point are available. This potentially increases the bandwidth provided to the user by using multiple paths more efficiently.

Although the invention has been described with reference to certain embodiments for which many implementation details have been described, it should be recognized that there are other embodiments within the spirit and scope of the claims and the invention is not intended to be limited to the details described with respect to the embodiments disclosed.

The invention claimed is:

1. A process for use as part of a routing protocol in a mobile ad hoc digital communications network composed of a plurality of nodes each of which includes a router having a routing table including routing information defining routing pathways through said network and one or more metrics defining message transfer characteristics for each such routing pathway, comprising the steps of:
    a) having a plurality of said nodes exchange routing information including routing pathways through said network and one or more metrics defining message transfer costs for each routing pathway;
    b) having one of said nodes calculate a measure of the degree to which it comprises an advantaged node;
    c) having an advantaged node increase one or more of the metrics of a plurality of pathways through said node entered into its routing table to form an updated routing table as a function of said measure of the degree to which it comprises an advantaged node; and
    d) having said updated routing table including adjusted metrics advertised across said network for the purpose of updating the routing tables of other network nodes.

2. The process of claim 1, wherein:
    said measure of the degree to which a node comprises an advantaged node is based on based on a ratio of a node's neighbors to the average number of its neighbor nodes' neighbors.

3. The process of claim 1, wherein:
    said routing protocol comprises a DSDV protocol and said one or more metrics comprises hop count, and
    said measure of the degree to which a node comprises an advantaged node is based on a ratio of a node's neighbors to the average number of its neighbor nodes' neighbors.

4. The process of claim 1, wherein:
    said routing protocol comprises a link state protocol and said one or more metrics comprises latency.

5. A process for use as part of a routing protocol in a mobile ad hoc digital communications network comprising of a plurality of nodes each of which includes a router having a routing table including routing information defining routing pathways through said network and including one or more metrics defining message transfer characteristics for each such routing pathway, comprising the steps of:
    a) having a plurality of said nodes exchange routing advertisement messages including routing pathways through said network and one or more metrics defining message transfer cost metrics for each routing pathway;
    b) having one or more of said nodes check to determine if they comprise partially disadvantaged nodes;
    c) having a partially disadvantaged node increase one or more of the metrics of a plurality of routing pathways through said node entered into a routing table in order to discourage all but essential traffic through said node and form an updated routing table; and
    d) having said updated routing table advertised across said network for the purpose of updating the routing tables of other network nodes.

6. The process of claim 5, wherein:
the step of having each node check to determine if it comprises a partially disadvantaged node includes the step of having the node check its available power reserves as a basis for determining if it may be a partially disadvantaged node.

7. The process of claim 5, wherein:
said routing protocol comprises a DSDV protocol and said one or more metrics comprise hop count.

8. The process of claim 5, wherein:
said routing protocol comprises a link state protocol and said one or more metrics comprise latency.

9. A process for use as part of a routing protocol in a mobile ad hoc digital communications network comprising a plurality of nodes each of which includes a router having a routing table including routing information defining routing pathways through said network and including one or more metrics defining message transfer characteristics for each such routing pathway, comprising the steps of:
   a) having a plurality of said nodes exchange routing advertisement messages including routing pathways through said network and one or more metrics defining message transfer cost metrics for each routing pathway;
   b) having one or more of said nodes check to determine if they comprise partially disadvantaged nodes;
   c) having one or more of said nodes check to determine if they comprise advantaged nodes;
   d) having an advantaged node increase one or more of the metrics of a plurality of routing pathways through said advantaged node entered into a routing table by a first amount in order to discourage traffic through said node and form a first updated routing table;
   e) having said first updated routing table advertised across said network for the purpose of updating the routing tables of other network nodes;
   f) having a partially disadvantaged node increase one or more of the metrics of a plurality of routing pathways through said partially disadvantaged node entered into a routing table by a second amount in order to discourage all but essential traffic through said partially disadvantaged node and form a second updated routing table; and
   g) having said second updated routing table advertised across said network for the purpose of updating the routing tables of other network nodes.

10. The process of claim 9, wherein:
the step of having each node check to determine if it comprises a partially disadvantaged node includes the step of having the node check its available power reserves as a basis for determining if it may be a partially disadvantaged node.

11. The process of claim 9, wherein:
said routing protocol comprises a DSDV protocol and said one or more metrics comprise hop count.

12. The process of claim 9, wherein:
said routing protocol comprises a link state protocol and said one or more metrics comprise latency.

* * * * *